US008732769B2

(12) United States Patent
Ogi et al.

(10) Patent No.: US 8,732,769 B2
(45) Date of Patent: May 20, 2014

(54) WIRELESS VIDEO TRANSMITTER

(75) Inventors: Yuya Ogi, Yokohama (JP); Nobuaki Kabuto, Kunitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 213 days.

(21) Appl. No.: 12/784,118

(22) Filed: May 20, 2010

(65) Prior Publication Data

US 2011/0004909 A1 Jan. 6, 2011

(30) Foreign Application Priority Data

Jul. 3, 2009 (JP) ................................ 2009-158362

(51) Int. Cl.
- *H04N 7/18* (2006.01)
- *H04N 7/173* (2011.01)
- *H04N 21/4363* (2011.01)
- *H04N 7/10* (2006.01)
- *H04N 7/20* (2006.01)

(52) U.S. Cl.
CPC ......... *H04N 21/43637* (2013.01); *H04N 7/106* (2013.01); *H04N 7/20* (2013.01)
USPC ................... 725/81; 725/93; 725/96; 725/97; 348/734

(58) Field of Classification Search
USPC .............................. 348/734; 725/81, 133–153
See application file for complete search history.

(56) References Cited

U.S. PATENT DOCUMENTS

| | | | | |
|---|---|---|---|---|
| 5,793,366 A | * | 8/1998 | Mano et al. | 715/839 |
| 5,883,621 A | * | 3/1999 | Iwamura | 725/37 |
| 5,917,822 A | * | 6/1999 | Lyles et al. | 370/395.4 |
| 6,131,130 A | * | 10/2000 | Van Ryzin | 710/6 |
| 6,421,069 B1 | * | 7/2002 | Ludtke et al. | 715/762 |
| 6,785,889 B1 | * | 8/2004 | Williams | 718/104 |
| 7,036,139 B2 | * | 4/2006 | Aras | 725/66 |
| 7,502,470 B2 | * | 3/2009 | Hanko et al. | 380/200 |
| 7,757,151 B2 | * | 7/2010 | Xu | 714/755 |
| 7,843,876 B2 | * | 11/2010 | Holt et al. | 370/329 |

(Continued)

FOREIGN PATENT DOCUMENTS

| | | |
|---|---|---|
| CN | 1551546 A | 12/2004 |
| CN | 101009813 A | 8/2007 |

(Continued)

OTHER PUBLICATIONS

A. K. Parekh and R. G. Gallager, "A generalized processor sharing approach to flow control—the single node case," in IEEE INFOCOM '92, vol. 2, pp. 915-924, May 1992.*

(Continued)

*Primary Examiner* — Mushfikh Alam
*Assistant Examiner* — Michael B Pierorazio
(74) *Attorney, Agent, or Firm* — McDermott Will & Emery LLP

(57) ABSTRACT

A technique is offered which is applied to a system for wirelessly sending and receiving control commands and which permits mutual communications owing to the control commands between a wireless video transmitter and wireless video receivers to be operated stably with low delay. The transmitter makes a decision as to whether commands received from the receivers are certain commands. If so, the transmitter assigns transmissible periods, in which the receivers can send commands, more preferentially to the wireless video receiver that has sent out the certain commands than the other wireless video receivers.

11 Claims, 12 Drawing Sheets

(56) References Cited

U.S. PATENT DOCUMENTS

| | | | |
|---|---|---|---|
| RE42,219 E * | 3/2011 | Schilling | 375/141 |
| 8,081,592 B2 * | 12/2011 | Sampath et al. | 370/312 |
| 2004/0001493 A1 * | 1/2004 | Cloonan et al. | 370/395.42 |
| 2005/0002362 A1 | 1/2005 | Kim et al. | |
| 2005/0246705 A1 * | 11/2005 | Etelson et al. | 718/100 |
| 2006/0209745 A1 * | 9/2006 | MacMullan et al. | 370/328 |
| 2006/0209880 A1 * | 9/2006 | Chang et al. | 370/464 |
| 2006/0209978 A1 * | 9/2006 | Jungnickel et al. | 375/267 |
| 2007/0105573 A1 * | 5/2007 | Gupta et al. | 455/509 |
| 2007/0105576 A1 * | 5/2007 | Gupta et al. | 455/509 |
| 2007/0171198 A1 | 7/2007 | Yokozawa | |
| 2008/0205306 A1 | 8/2008 | Saito | |
| 2009/0006692 A1 * | 1/2009 | Blumrich et al. | 710/244 |
| 2009/0167552 A1 * | 7/2009 | Sato et al. | 340/825.22 |
| 2009/0176503 A1 * | 7/2009 | Sampath et al. | 455/450 |
| 2009/0210539 A1 * | 8/2009 | Funabiki et al. | 709/228 |
| 2009/0238212 A1 * | 9/2009 | Roethig et al. | 370/498 |
| 2010/0071018 A1 * | 3/2010 | Kabuto | 725/127 |
| 2010/0073574 A1 * | 3/2010 | Nakajima et al. | 348/723 |
| 2010/0199298 A1 * | 8/2010 | Kabuto et al. | 725/25 |
| 2013/0042250 A1 * | 2/2013 | Lim et al. | 718/103 |
| 2013/0042251 A1 * | 2/2013 | Nader | 718/103 |

FOREIGN PATENT DOCUMENTS

| | | |
|---|---|---|
| JP | 11-177965 | 7/1999 |
| JP | 2004-080729 | 3/2004 |
| JP | 2005-005951 A | 1/2005 |
| JP | 2008-042525 | 2/2008 |
| JP | 2008-219157 A | 9/2008 |

OTHER PUBLICATIONS

Chinese Office Action, w/ English translation thereof, issued in Chinese Patent Application No. CN 201010189737.4 dated Jan. 31, 2012.

Japanese Office Action issued in Japanese Application No. 2009-158362 dated Apr. 23, 2013 with English Translation.

* cited by examiner

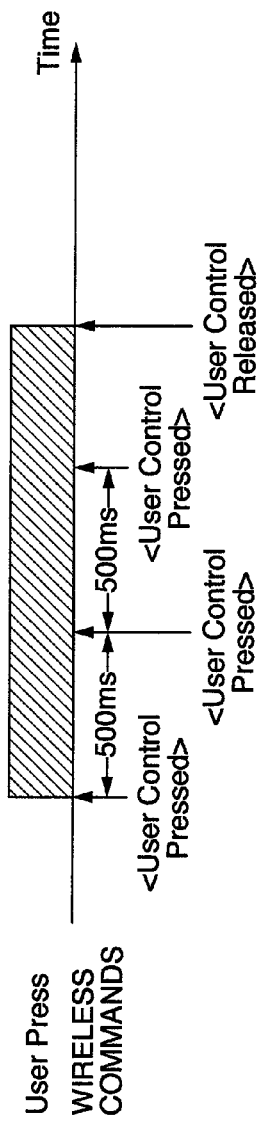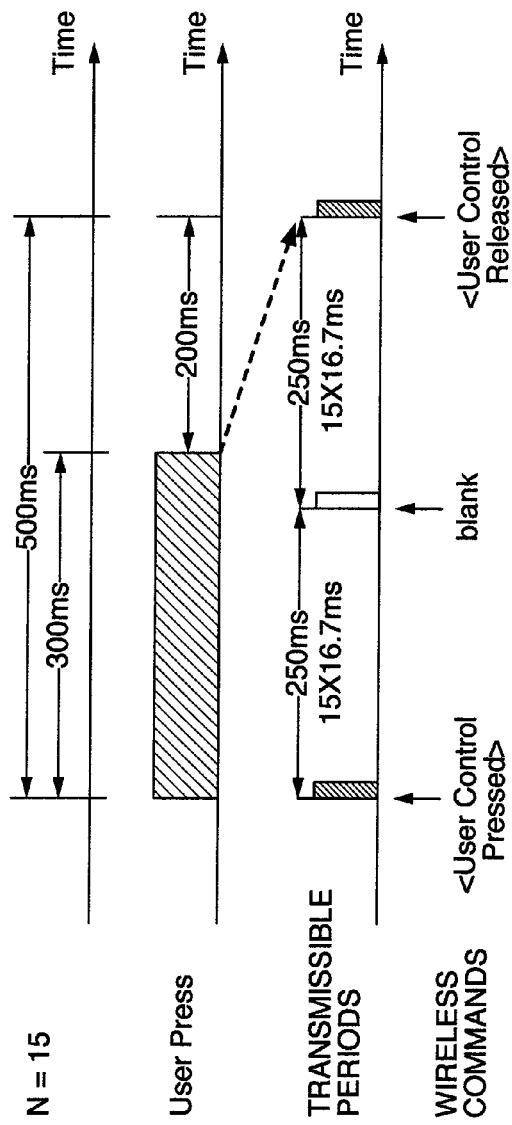

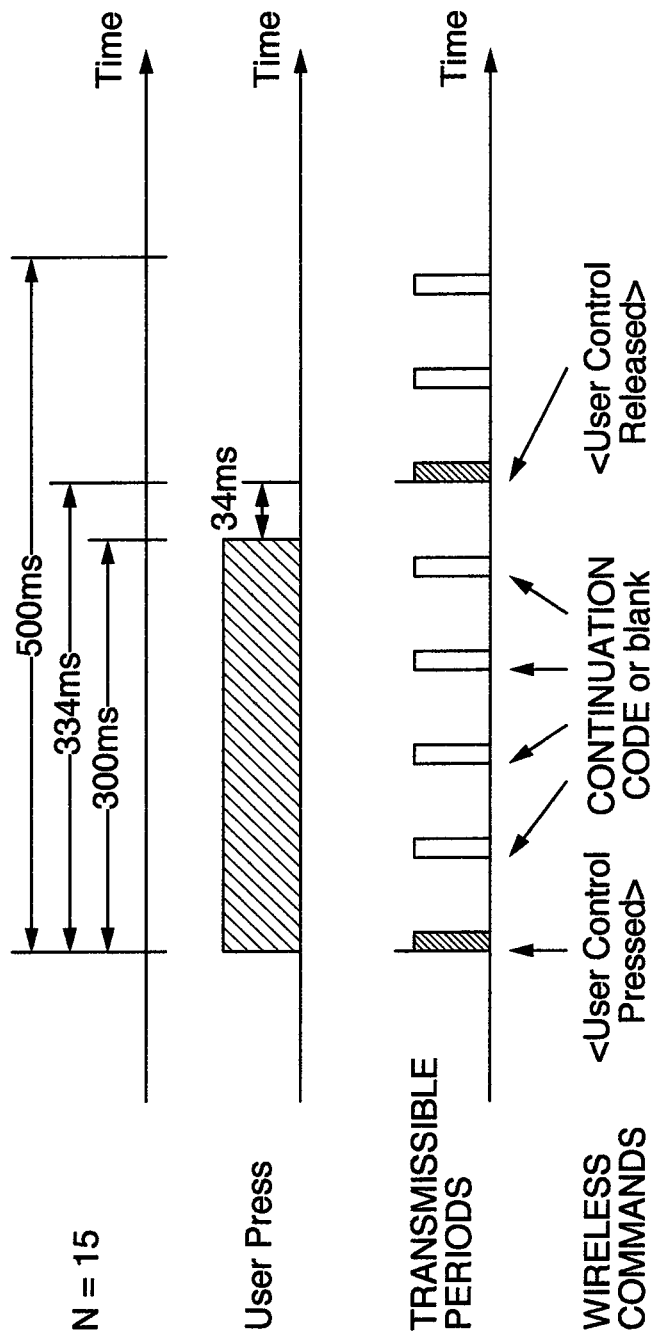

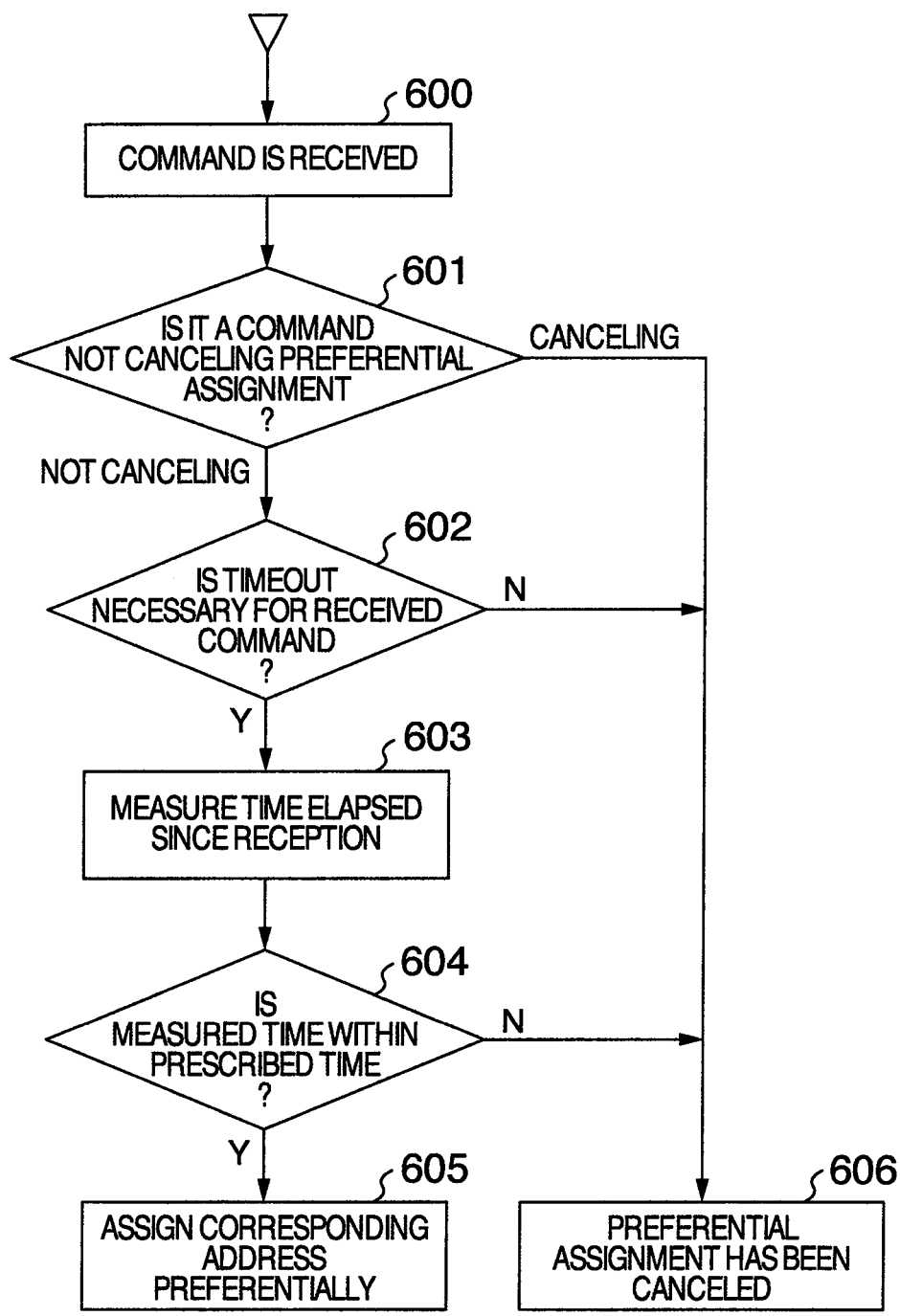

WIRELESS VIDEO TRANSMITTER

INCORPORATION BY REFERENCE

The present application claims priority from Japanese Patent Application JP2009-158362 filed on Jul. 3, 2009, the content of which is hereby incorporated by reference into this application.

BACKGROUND OF THE INVENTION

The present invention relates to a system for wirelessly sending video and audio signals from a video transmitter to plural video receivers and, more particularly, to a technique for communicating control commands and other commands between the video transmitter and the video receivers.

A technique for sending video signals from a video transmitter to plural video receivers and transmitting control commands between the video transmitter and the video receivers is known, as described in JP-A-11-177965 in which there is disclosed a technique permitting peripheral devices to be controlled at all times by assigning regions for transmitting audio and video and regions for transmitting information for controlling the peripheral devices to different transmission regions.

The above-described prior art has the following problems. Firstly, within one frame for transmission of video, peripheral device-controlling information coming from every video receiver connected is allowed to be transmitted and, therefore, when control information is transmitted from all the video receivers, the region assigned to each video receiver is reduced, because the transmission region is finite, thus creating the possibility that the necessary information cannot be transmitted.

Secondly, the priorities of control information from all the video receivers are not set and so control information with high real-timeness for which settings are established by mutual communications is not processed preferentially. Consequently, the responsiveness to the control information with high priority decreases.

SUMMARY OF THE INVENTION

In view of the foregoing problem, the present invention has been made. It is an object of the invention to provide a technique which is applied to a system for wirelessly sending video and audio signals from a video transmitter to plural video receivers and which can enhance the responsiveness to control commands while securing a transmission region necessary for communications of the control commands between the video transmitter and the video receivers.

The present invention provides a system for wirelessly sending video and audio signals from a video transmitter to plural video receivers, the system controlling assignment of regions (transmissible periods) for transmitting control commands to the video receivers according to the kinds of the control commands communicated between the video transmitter and the video receivers. Specifically, the transmissible periods are preferentially assigned to that of the video receivers which sends given control commands of higher priority to the video transmitter. The preferential assignment of the transmissible periods includes, for example, processing for making the transmissible period for the video receiver sending the given control commands longer than the transmissible period for any other video receiver during a given interval of time.

The aforementioned given control commands of higher priority may be control commands periodically issued, for example, when a button on a remote control unit for controlling a device or equipment is kept depressed for more than a given time.

The transmissible periods may be the vertical retrace periods of a video signal sent wirelessly. In this case, transmissible periods for two or more video receivers may be assigned within one vertical retrace period.

According to the present invention, the response to control commands can be enhanced while securing transmission regions necessary for communications of the control commands between a video transmitter and plural video receivers. Furthermore, mutual communications owing to the control commands between the video transmitter and the video receivers can be operated stably.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram illustrating an example of <User Control Pressed> command in the CEC stipulated in the HDMI standard;

FIG. 4 is a schematic representation of a transmissible period used when sequential assignment associated with the first embodiment is made;

FIG. 5 is a schematic diagram illustrating how transmissible periods are assigned preferentially to a certain receiver in accordance with the first embodiment;

FIG. 6 is a flowchart illustrating a routine (processing) for assignment performed when commands are received in accordance with the first embodiment;

DETAILED DESCRIPTION OF THE EMBODIMENTS

Embodiments associated with the present invention are hereinafter described with reference to the drawings.

<<Embodiment 1>>

Figure 1:
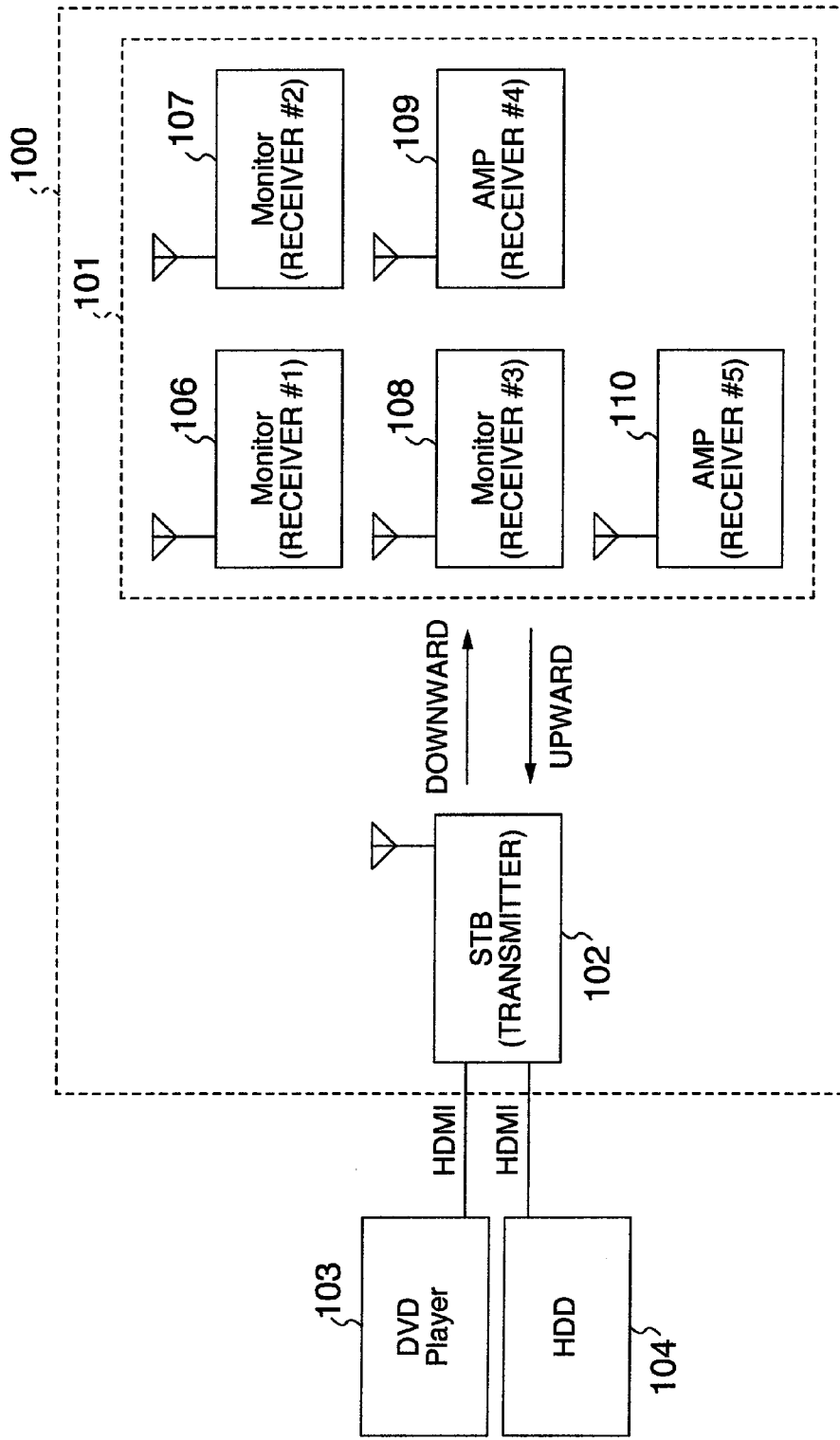
FIG. 1 is a block diagram showing one example of configuration of a wireless network to which an embodiment of the present invention is applied.

FIG. 1 is a block diagram showing one example of configuration of a wireless communication system associated with a first embodiment of the present invention. The system has a wireless video transmitter 102, a group of wireless video receivers 101, and a wireless network 100 for wirelessly sending video and audio signals from the wireless video transmitter 102 to wireless video receivers 106-110 (shown as Monitor or AMP) included in the group of video receivers 101 and for communicating control commands between the wireless video transmitter 102 and the wireless video receivers 106-110. The group of video receivers 101 includes the wireless video receivers 106-110 and monitors such as TV sets and amplifiers for outputting of audio. For example, a DVD player 103 for outputting video and audio signals and a HDD recorder 104 are connected with the wireless video transmitter 102 by cables such as HDMI (High-Definition Multimedia Interface) cables. In the following description, the DVD player 103, HDD recorder 104, monitors, amplifiers, and so on may be referred to as audiovisual devices. The wireless video transmitter 102 may be an STB (set-top box) having a tuner for receiving TV broadcasts.

Figure 13:
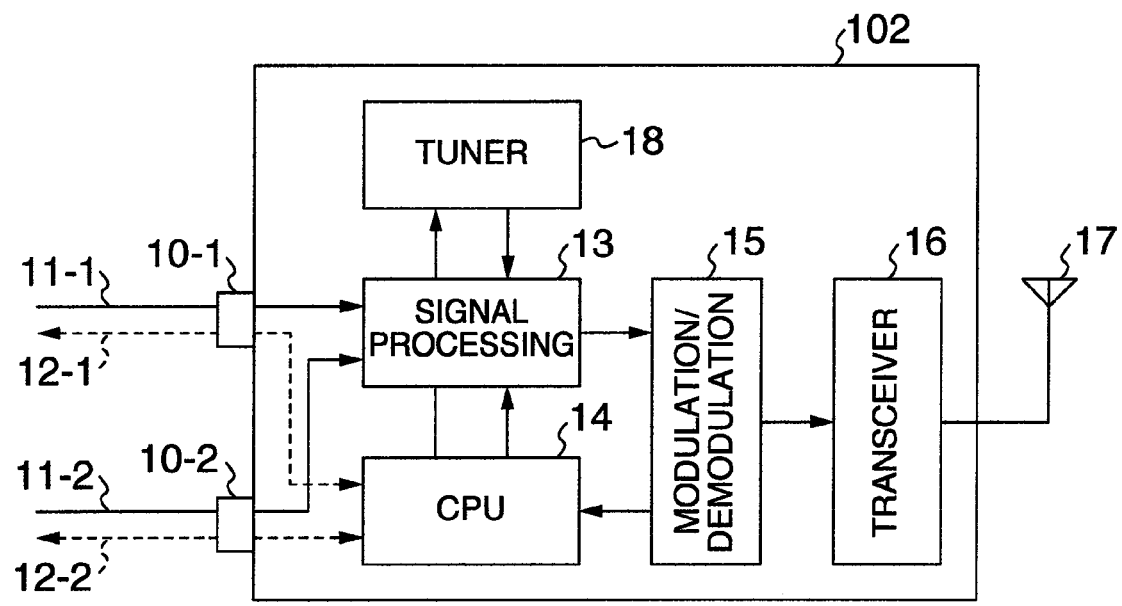
FIG. 13 is a block diagram showing one example of configuration of a wireless video transmitter associated with the first embodiment.

The operation of the system is described below by referring also to FIG. 13, which shows one example of configuration of the wireless video transmitter 102 of the present system associated with the present embodiment. The transmitter 102 has a first input terminal 10-1 and a second input terminal 10-2 to which an HDMI cable, for example, for the DVD player 103 and an HDMI cable, for example, for the HDD recorder 104 are respectively connected. Video and audio signals from the audiovisual devices (DVD player 103 and HDD recorder 104) are input via the HDMI cables. Each HDMI cable includes an A-V line 11-1 or 11-2 for transferring audio and video signals and a CEC (Consumer Electronics Control) line 12-1 or 12-2 for communicating control commands. Audio and video signals entered to the first input terminal 10-1 or the second input terminal 10-2 through the A-V line are supplied to a signal-processing portion 13. A tuner 18 receives digital TV broadcast signals of the channel selected by a CPU 14 being a control portion, demodulates and decodes the signals, and supplies them to the signal-processing portion 13. The signal-processing portion 13 superimposes headers and control commands (described later) supplied from the CPU 14 onto the supplied video signal and outputs the resulting signal. The audio and video signals from the signal-processing portion 13 are modulated using a carrier for wireless transmission by a modulation-demodulation portion 15. The modulated audio and video signals are passed through a transceiver portion 16 and wirelessly transmitted to the group of wireless video receivers 106-110 and to other wireless video receivers on standby and wireless video transmitters (none of which are shown) via an antenna 17.

On the other hand, the wireless video receivers 106-110 have their respective remote control light-sensitive portions (not shown). Each receiver has a function of wirelessly sending a remote control signal received by the remote control light-sensitive portion to the wireless video transmitter 102. For example, where the user is watching and listening to some video reproduced from the HDD recorder 104 on the monitor (receiver #1) being the wireless video receiver 106, if he or she wants to switch the presently viewed video to another video program recorded in the HDD recorder 104, the user manipulates the remote control unit for the HDD recorder 104 to send a remote control signal including control commands for switching the reproduced video to the receiver #1. The receiver #1 receives the remote control signal and wirelessly sends a signal of the control commands to the wireless video transmitter 102.

The control commands wirelessly transmitted from the group of wireless video receivers 106-110 are received by the transceiver portion 16 via the antenna 17. The control commands are given to the CPU 14, where the commands are analyzed to determine the kinds of commands. If the control commands indicate switching of the video reproduced from the HDD recorder 104 as described above, the CPU 14 sends the control commands to the HDD recorder via the CEC line 12-2 of the HDMI cable connected to the second input terminal 10-2. If the control commands indicate tuning to a desired channel, the CPU 14 outputs a control signal to the tuner 18 to provide tuning to the desired channel.

In this way, the wireless network 100 equipped with the audiovisual devices, wireless transmitter 102, and group of wireless video receivers 106-110 is constituted.

Furthermore, the CPU 14 of the wireless video transmitter 102 has a function of controlling the assignment of transmission regions (transmissible periods) used for transfer of control commands from the group of wireless video receivers 106-110 according to the kind and contents of the control commands. The details of the function will be described later. The wireless video transmitter 102 can also receive commands from other wireless video receivers on standby and wireless video transmitters (none of which are shown).

The manner in which audio and video signals and control commands are transferred through this system is described below by referring to FIG. 2. In the following description, the direction of transfer from the wireless video transmitter 102 of FIG. 1 to the group of wireless video receivers 106-110 is defined as the downward direction, while the reverse direction is defined as the upward direction. That is, in this embodiment, audio and video signals and control commands from the wireless video transmitter to the group of wireless video receivers are in the downward direction. Control commands from the group of wireless video receivers to the video transmitter are in the upward direction.

In the example of the wireless video transmitter 102 shown in FIG. 1, control commands in the downward direction are multiplexed within a video signal 200 in the downward direction (FIG. 2(a)) and transmitted. In FIG. 2(a), each of images 1, 2, and 3 is a video signal of one frame or one field. In each frame of video signal (such as image 1 and image 2), a corresponding audio signal is superimposed. Headers (Header_1 to Header_5) are added respectively to the beginnings of the frames of video signals (image 1, image 2, and so forth). Vertical retrace periods (VBI_1 to VBI_5) are placed immediately behind the frames of video signals, respectively. The vertical retrace periods (VBI_1 to VBI_5) are assigned as transmissible periods used to transfer control commands in the upward direction, i.e., from a wireless video receiver to the video transmitter. An ID number given to each wireless video receiver is written in each header. Only the wireless video receiver corresponding to the ID number written in the header is allowed to send the control commands during the vertical retrace period following the video signal to which the header is attached. For example, where #2 is written in the header (Header_3) attached to the image 3 as the ID number of the wireless video receiver, only the wireless video receiver with #2 (i.e., monitor 107) is allowed to send control commands during the vertical retrace period (VBI_3) subsequent to the image 3. That is, each wireless video receiver receives one frame of video signal transmitted from the wireless video transmitter and compares the ID number written in the header attached to the head with the ID number held in itself. If a match is obtained, the wireless video receiver is permitted to transmit control commands during the vertical retrace period subsequent to the frame. If no match exists, the wireless video receiver is inhibited from transmitting control commands.

Where the number of the wireless video receivers present in the wireless network is five as shown in FIG. 1, all the wireless video receivers can send out control commands if a period of 5 frames is available. For example, if ID numbers of #1 to #5 are sequentially written in the headers, respectively, added to five frames of video signal (specifically, #1 is written in the header of image 1, #2 is written in the header of image 2, and so forth), then the vertical retrace periods VBI_1 to VBI_5 can be assigned as transmissible periods for transfer of control commands for the wireless video receivers #1-#5, respectively, as shown in FIG. 2(b). The processing or method for assigning the transmissible periods for control commands of each receiver to all the wireless video receivers within the network in turn every frame in this way may be hereinafter referred to as the sequential assignment.

Where the sequential assignment is made, if there are the five wireless video receivers in the wireless network as shown in FIG. 1, a state in which one wireless video receiver can send out control commands occurs at a frequency of 60 Hz of the vertical scanning frequency of the video signal, i.e., every 16.7 ms×5=83.5 ms provided that the vertical scanning period is 16.7 ms. That is, if there are N wireless video receivers within the wireless network, control commands are sent out every 16.7×N ms. As a result, a delay time that can be felt by the user may take place from the issuance of control commands to the response. Especially, in a case where control commands have so high real-timeness that settings of control commands are established by mutual communications (i.e., the priority of the commands are so high that it is necessary or desirable to respond to the commands quickly), if there is a delay time as described above, the responsiveness or the stability of the system will deteriorate, thus causing discomfort to the user.

For example, a control command with high real-timeness as described above is <User Control Pressed> defined in CEC. The <User Control Pressed> in CEC stipulated in the HDMI standard is now briefly described with reference to FIG. 3.

The <User Control Pressed> indicates commands sent out when a button on a remote control unit is kept pressed by the user. According to the HDMI standard, when the button is kept pressed for more than 500 ms, a <User Control Pressed> command must be resent out every 500 ms. When the button is released, a <User Control Released> command is sent out. In this way, where the <User Control Pressed> signal is received, it follows that the receiving device again receives the control commands from the source device.

One example of the relationship between the <User Control Pressed> command and the transmissible periods in sequential assignment is shown in FIG. 4, which is a sequence diagram drawn on the assumption that a transmissible period arrives at the same time when a button on the remote control unit is depressed. Strictly, the button is pressed for a period of 300 ms. It is also assumed that the number of wireless video receivers is 15 (N=15).

After the wireless video receiver has sent the <User Control Pressed > command, the next transmissible period is assigned when a period of 16.7 ms×15≅250 ms has passed. At this timing, the button remains depressed and so the wireless video receiver sends out no commands. A further next transmissible period is assigned still after a lapse of 250 ms. A time lag of about 200 ms occurs since the user has released the button. Then, the <User Control Released> command is sent out. Where the sequential assignment is made in this way, if control commands are sent out as described above, there is the possibility that a time lag occurs until a response is generated, thus deteriorating the controllability.

Accordingly, in the present embodiment, the transmissible periods are preferentially assigned to a wireless video receiver (hereinafter referred to as the certain receiver) that has sent out control command of high priority, thus improving the responsiveness and stability of the system. For example, as shown in FIG. 2(a), when the receiver #1 has sent out a certain control command generated in response to a user's manipulation of the remote control unit (e.g., a <User Control Pressed> command defined, for example, in CEC), the CPU 14 of the wireless video transmitter preferentially assigns the transmissible periods to the receiver #1.

In the present embodiment, "preferential assignment" means that the transmissible period for the certain receiver is extended during a period (hereinafter referred to as the control command transmission period) in which all the wireless video receivers can send out control commands. For example, if there are five wireless video receivers, the control command transmission period is equal to the period of 5 frames. In the sequential assignment, as shown in FIG. 2(b), the vertical retrace periods VBI_1 to VBI_5 are assigned to transmissible periods for the receivers #1 to #5, respectively. Where the receiver #1 is the certain receiver, the transmissible period assigned to the certain receiver during the control command transmission period is extended by assigning the vertical retrace periods VBI_3 and VBI_5 to the transmissible period for the receiver #1, as well as VBI_1. In other words, where the certain receiver is present within the wireless network, the transmissible period assigned to the certain receiver during the control command transmission period is made shorter than in the sequential assignment. Consequently, mutual communications owing to control commands between the wireless video transmitter and the wireless video receivers can be operated stably.

One example of method of assigning transmissible periods in accordance with the present embodiment is described by referring to FIG. 5.

FIG. 5 illustrates a case in which transmissible periods are assigned preferentially and periodically (once in every four times) to the certain receiver after it has sent the <User Control Pressed> command provided that the period in which the button is kept depressed is the same as in FIG. 4. For example, if it is assumed that the number of wireless video receivers is 15 (N=15) and the certain receiver is the receiver #1, then the wireless video transmitter assigns the value of N of VBI_N for each wireless video receiver to 1, 2, 3, 4, 5, 6, 7, 8, 9, 10, 11, 12, 13, 14, 15, and so forth before the <User Control Pressed> command is received. On the other hand, after reception of the <User Control Pressed> command, the transmissible period for the receiver #1 is assigned periodically while varying the value of N to 1, 2, 3, 4, 1, 5, 6, 7, 1, 8, 9, 10, 1, 12, 13, etc.

Figure 2:
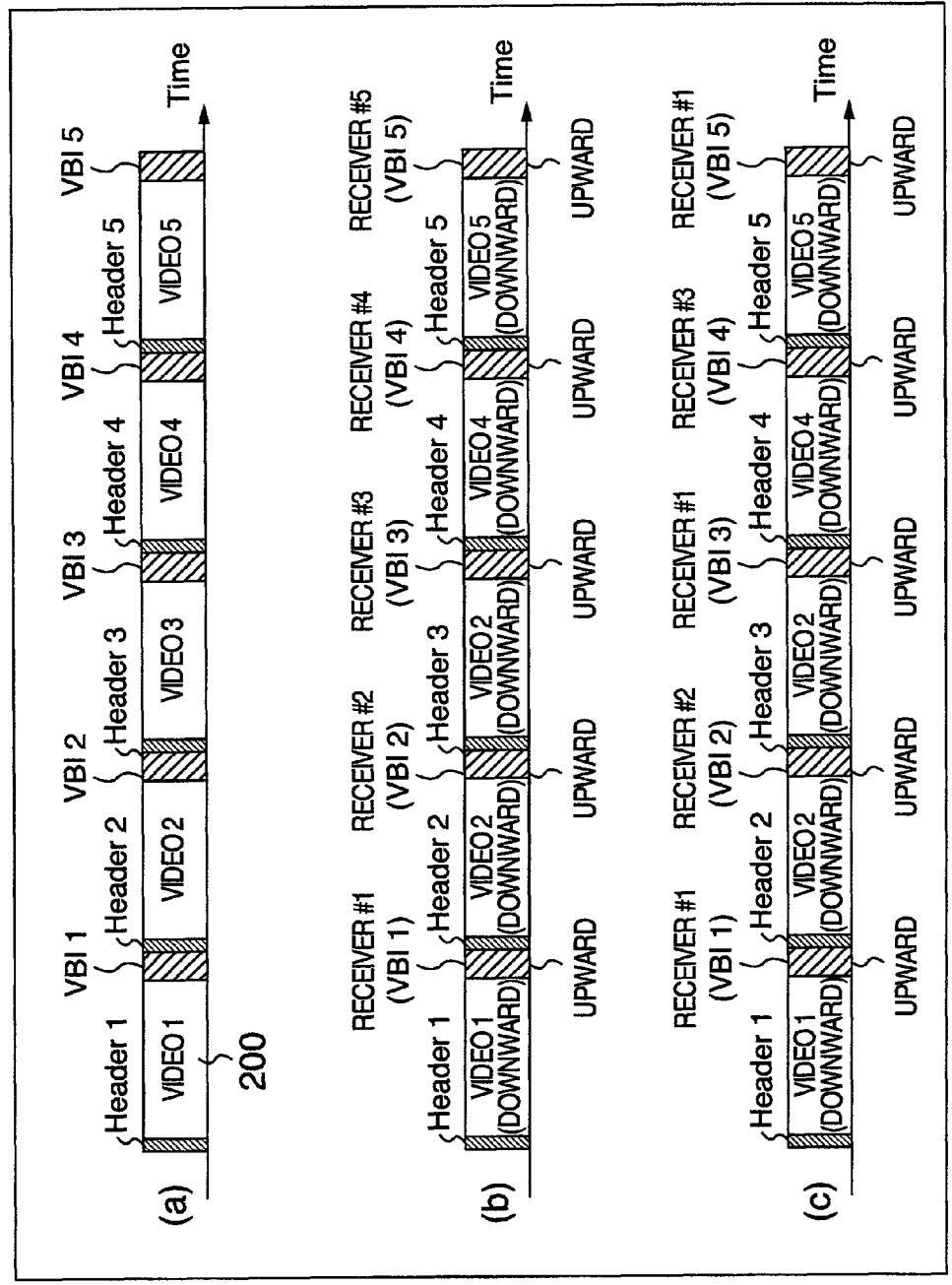
FIG. 2 is a schematic diagram illustrating an assignment to wireless receivers during a transmissible period, the assignment being associated with a first embodiment of the invention.

The assignment of transmissible periods described so far is controlled by varying the ID number given to the receiver written in the header added to the beginning of each frame of video signal as shown in FIG. 2. This is described in further detail by referring to FIG. 13. The CPU 14 of the wireless video transmitter discerns the type (contents) of the control commands coming from the wireless video receiver and received at the transceiver portion 16, as well as the wireless video receiver that has sent out the commands. The discernment of the wireless video receiver may be easily done, for example, by attaching the ID number of the wireless video receiver to the control commands from the wireless video receiver. As a result, if it is determined, for example, that the receiver #1 has sent out a certain control command, e.g., <User Control Pressed>, the CPU 14 varies the ID number of the header that is changed in turn, such as 1, 2, 3, 4, 5, 6, 7, and so forth, within each frame during the control command transmission period such that "1" appears, for example, every fourth frame (e.g., 1, 2, 3, 4, 1, 5, 6, 7, 1, and so forth). As a result, the interval between transmissible periods assigned to the receiver #1 is varied from 15 frames (equal to the control command transmission period) to 4 frames, thus greatly shortening the interval at which control commands from the certain receiver are transmitted.

When transmissible periods are preferentially and periodically assigned to the certain receiver that sends out given control commands as described above, the transmissible periods are assigned first to the certain receiver after a lapse of 16.7 ms×(4×5)=334 ms since the user has released the button in the example of FIG. 5. After a lapse of 34 ms since the user has released the button, it is possible to cause the receiver #1 to send out the <User Control Released> command. This can shorten the time lag in the mutual communications between the wireless video transmitter and the wireless video receiver.

In this embodiment, the certain receiver may send out a continuation code indicating that the control commands persist in time. One example of the continuation code is described by referring to FIG. 5. As shown in this figure, the wireless video receiver periodically sends out a continuation code (or a blank) indicating that the <User Control Pressed> command now continues to persist during the assigned transmissible period while the user keeps pressing the button after transmission of the <User Control Pressed> command. It may be possible to make a choice as to whether or not such a continuation code should be transmitted. Issuance of the continuation code can inform the wireless video transmitter that a control command transmitted at some instant of time continues to be sent out since then.

The aforementioned transmissible periods may be assigned at will during the control command transmission period as long as the transmissible period for the certain receiver is longer than those for other receivers. However, it is desired that the transmissible periods be assigned periodically during the control command transmission period.

A flowchart illustrating assignment processing performed when the certain control command is received, i.e., a routine executed by the CPU 14 of the wireless video transmitter to make the assignment illustrated in FIG. 5, is illustrated in FIG. 6. In the following description, each processing step may be indicated by "S". The prefix "S" is omitted in the drawings When the transceiver portion 16 of the wireless video transmitter receives a control command (S600), the CPU 14 makes a decision as to whether the control command does not cancel the preferential assignment (S600). A command canceling the preferential assignment is typified by the above-described <User Control Released> command and indicates that any other command is unlikely to follow. Alternatively, it is a response command issued by the wireless video receiver, to which the preferential assignment is made, in response to the command sent out by the wireless video transmitter. If it is a command canceling the preferential assignment (S601), control goes to a deassigned state (S606) in which the preferential assignment to the wireless video receiver that has sent out the command has been canceled. If it is a command not canceling the preferential assignment, control proceeds to S602, where a decision is made as to whether or not a timeout operation on the received command is needed (S601).

The timeout operation consists of measuring the time elapsed since the reception of a command which might be reissued from the same device within a prescribed period from the reception of the command, as typified by the <User Control Pressed> command in the present embodiment, and preferentially assigning a transmissible period to a corresponding address of the wireless video receiver (certain receiver) that has sent out a command not canceling the preferential assignment if the measured time is within the prescribed period. For example, the address is the ID number (#1-#5) of the wireless video receiver. Where a network address is allocated to each individual wireless video receiver, a network address may be used instead of the ID number.

If the decision at S602 is that no timeout operation is needed, control goes to S606, where the assignment has been canceled. On the other hand, if the decision is that the timeout operation is needed, control proceeds to S603 in order to carry out the timeout operation. In particular, the time elapsed since the reception of the command is measured. In S604, a decision is made as to whether or not the time measured at S603 is within the prescribed period. If the decision is negative (No), control goes to S606, where the assignment has been canceled. If the decision is that the measured time is within the prescribed period, control goes to S605, where the transmissible period in the control command transfer period is preferentially assigned to the address corresponding to the certain receiver. For this preferential address assignment, the address (ID number) of the wireless video receiver written in the header added to each frame of video signal may be altered, as already described in connection with FIG. 2(c).

In FIG. 6, a case in which commands from a single wireless video receiver are received is illustrated. Where plural wireless video receivers send out commands within the prescribed period, it is desired that preferential assignment be made for at least two receivers and that preferential assignment for the third and following receivers be canceled from the temporally oldest one. Preferably, the prescribed period is less than 600 ms.

Figure 7:
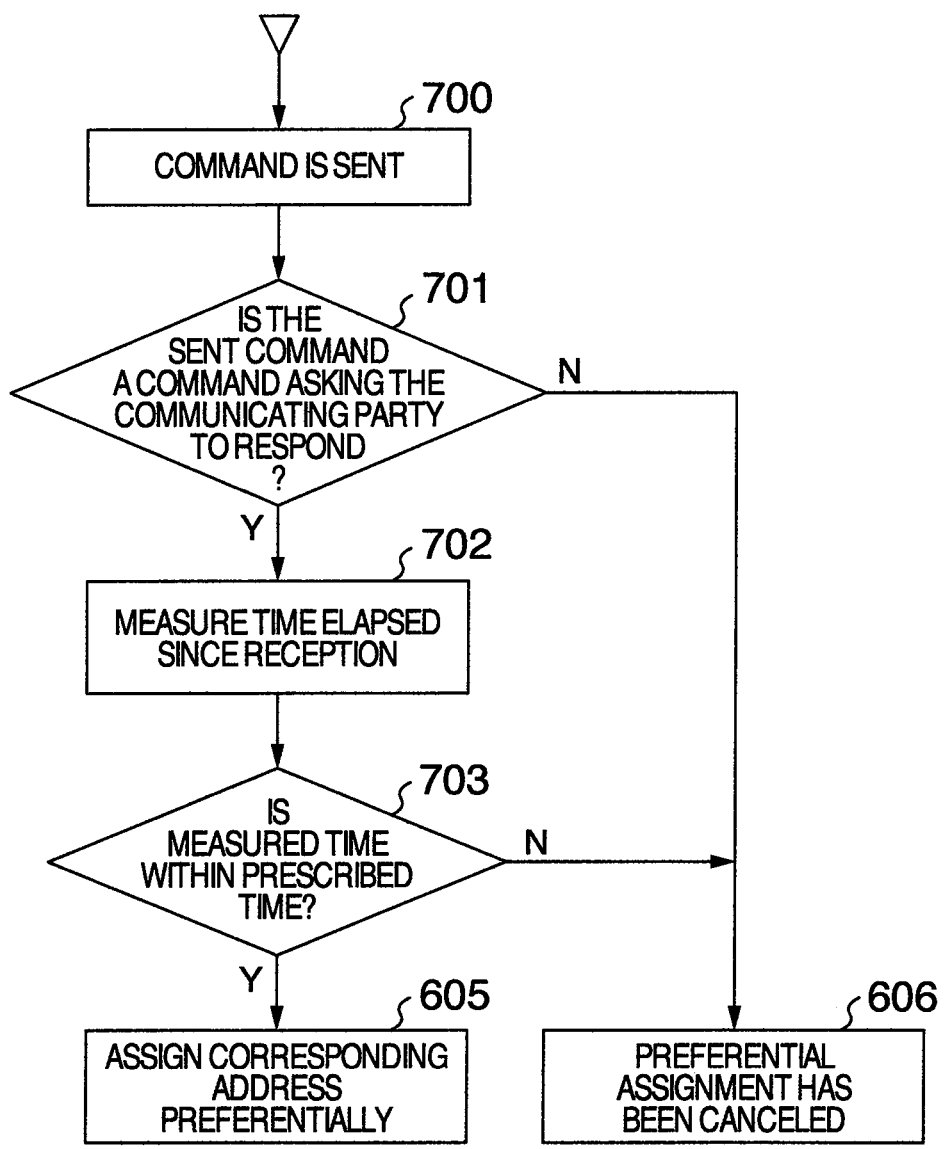
FIG. 7 is a flowchart illustrating a routine (processing) for assignment performed when commands are sent in accordance with the first embodiment.

FIG. 7 shows a flowchart of an assignment routine (processing) executed by the CPU 14 of the wireless video transmitter when commands are sent out.

If the transceiver portion 16 sends out a command (S700), the CPU 14 of the wireless video transmitter makes a decision as to whether the command asks the command destination (wireless video receiver) to respond (S701). This command asking the communicating party to respond creates the possibility that a reply (such as a receipt acknowledgment) from the communicating party is transmitted after the transmission of the command. A typical example of this command is a command making an inquiry to the wireless video receiver. If the decision at S701 is that it is unlikely that the communicating party responds to the sent command, control goes to a deassigned state (S606) in which the preferential assignment to the wireless video receiver to which the command has been sent has been canceled. On the other hand, where it is possible that the communicating party may respond to the sent command, the time elapsed since the command transmission is measured (S702). Subsequently, in S703, a decision is made as to whether the measured time is within the prescribed period. If the decision is that the measured time is within the prescribed period, the transmissible periods are preferentially assigned to the address corresponding to the command destination (wireless video receiver (the certain receiver)). This processing for address assignment is similar to the method described already in connection with FIG. 6. Although the prescribed period during transmission may be identical with or different from the prescribed period (e.g., 600 ms) during reception, the period is preferably less than 1 s.

The routine (processing) for assignment during transmission of the given control command may have the same priority as the routine (processing) for assignment during reception of the given control command. A higher priority may be given to the latter processing performed during reception. For instance, when a certain control command sent from the receiver #1 is received and the certain control command asking the receiver #2 to respond is sent to the receiver #2, a transmissible period (#1) for reception of the certain control command and a transmissible period (#2) for transmission of the certain control command may be periodically assigned such that the former period (#1) is assigned once every 2 frames and the latter period (#2) is assigned once every 4 frames during the control command transmission period as shown below. In this embodiment, because a higher priority is given to the processing performed during reception, the transmissible period for the receiver #1 is set longer than the transmissible period for the receiver #2.

1, 2, 1, 3, 1, 2, 1, 4, 1, 2, 1, 5, 1, 2, 1, 3, . . .

Furthermore, the transmissible period (#1) for reception of the certain control command and the transmissible period (#2) for transmission of the certain control command may be periodically assigned such that each period is assigned once every 3 frames as shown below.

1, 2, 3, 1, 2, 4, 1, 2, 5, 1, 2, 3, . . .

As described so far, according to the present embodiment, a system for wirelessly transmitting audio and video signals from a video transmitter to plural video receivers is so designed that a transmissible period during which transmission of a control command is permitted is assigned to a certain wireless video receiver that will or is forecasted to transmit a certain control command of a high priority more preferentially than other wireless video receivers during the control command transmission period. Therefore, the transmissible period for the certain wireless video receiver can be made longer than the transmissible periods for other video receivers. Consequently, the responsiveness and stability of the system can be improved.

In the above embodiment, the <User Control Pressed> command is taken as an example of the certain control command. The present invention is not limited to this example. Obviously, any other command that asks for a quick response may be similarly applied. Furthermore, in the present embodiment, the control command may be other than an instruction for executing a given operation on a device or equipment. For example, the command may include various messages for giving a notice of the status of the device. That is, if the message is of a high priority, transmissible periods may be preferentially assigned to the device that sends out the message.

In addition, in the above embodiment, the description centers on wireless video receivers in operation. Transmissible periods may also be assigned preferentially to other devices existing within the wireless network (such as wireless video receivers on standby and other wireless video transmitters). In addition, in the above embodiment, preferential assignment of transmissible periods to the certain wireless video receiver is made by varying the ID number of the receiver written in the header added to the beginning of each frame of video signal. However, it is obvious that any technical means can be adopted as long as it is a method capable of specifying vertical retrace periods that are command transmission periods in the downward direction.

<<Embodiment 2>>

Figure 8:
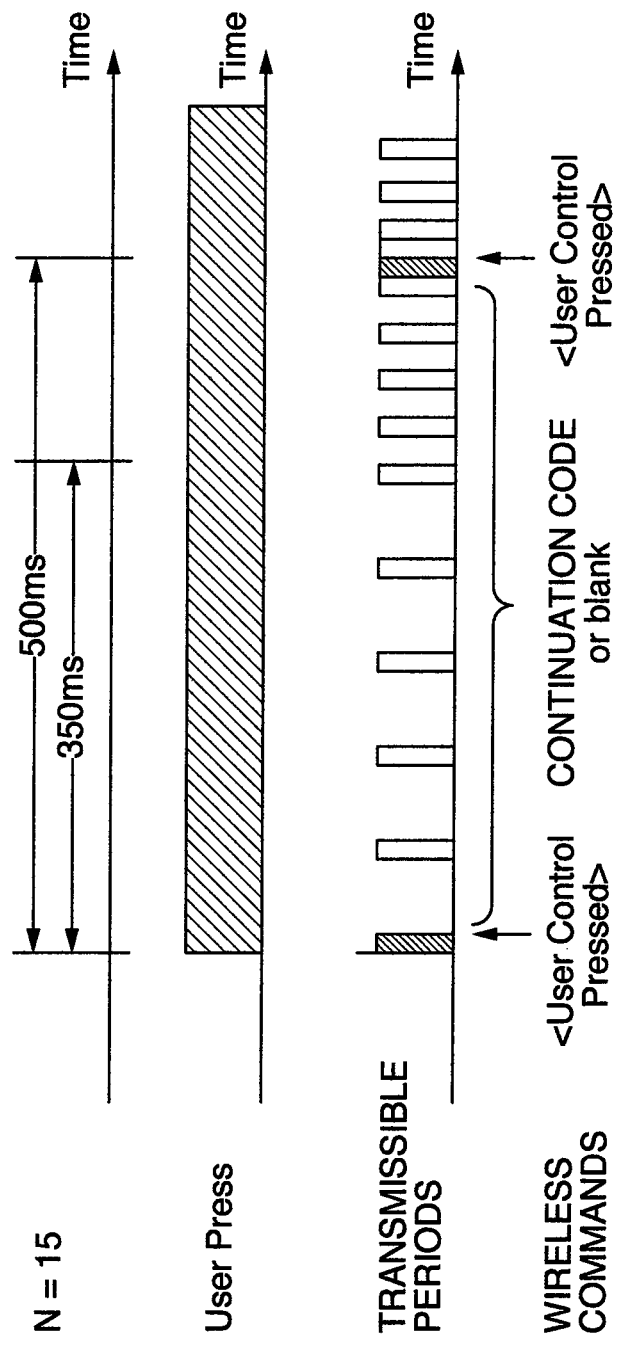
FIG. 8 is a schematic diagram of transmissible periods associated with a second embodiment of the invention.
Figure 9:
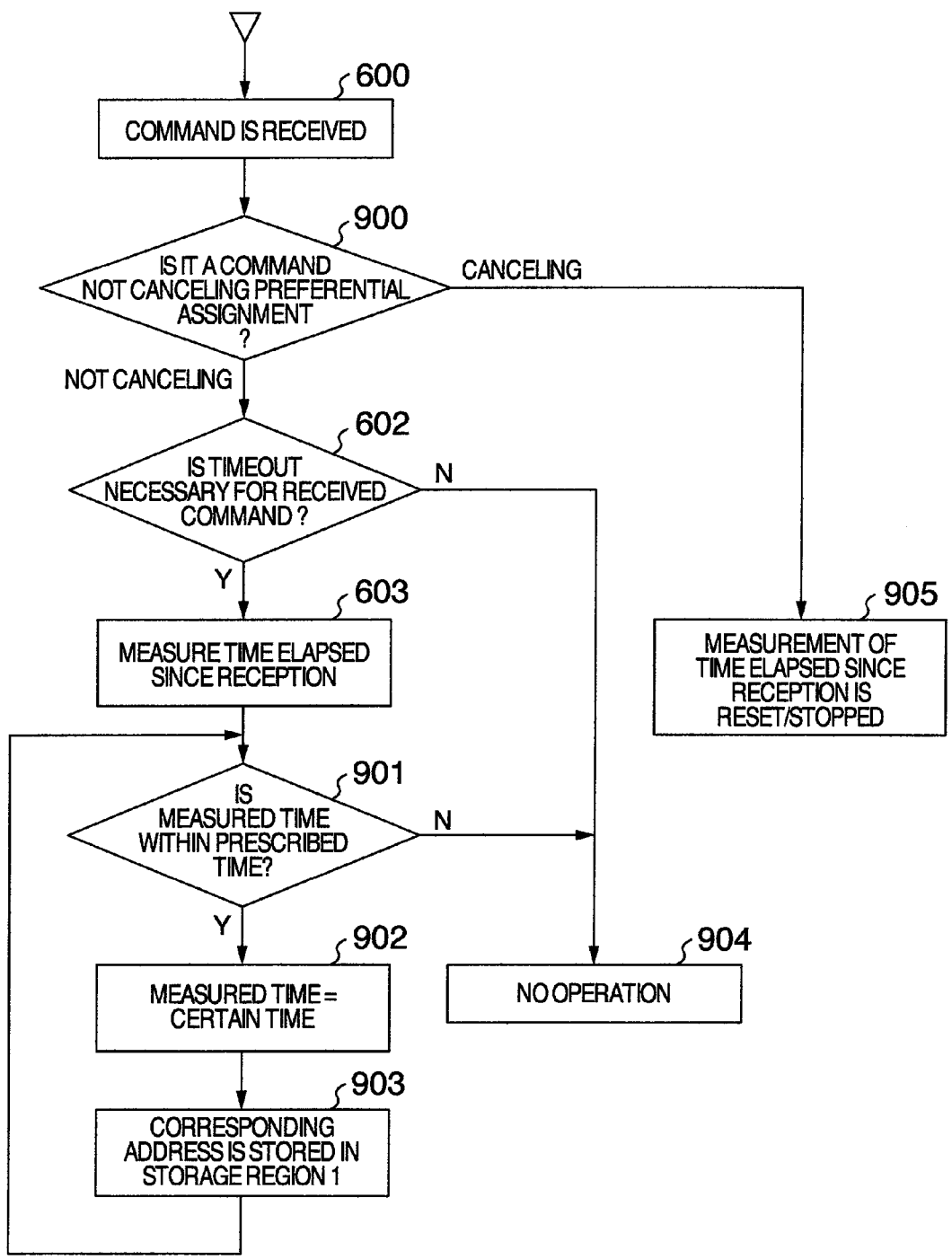
FIG. 9 is a flowchart illustrating a routine (processing) for assignment performed when commands are received in accordance with the second embodiment.

A second embodiment (Embodiment 2) of the present invention is next described by referring to FIGS. 8 and 9. The second embodiment of the invention is different from the first embodiment in terms of the operation for the wireless video transmitter to assign transmissible periods to the destination of the certain command or to the receiving wireless video receiver in such a way that a higher priority is given to the operation for assignment during reception of control commands than the operation for assignment during transmission of the certain control command.

FIG. 8 illustrates one example of the configuration of transmissible periods in a case where the second embodiment is applied.

As already described, when a button is kept pressed for more than 500 ms as shown in FIG. 8, the <User Control Pressed> command in CEC stipulated in the HDMI standard must be resent every 500 ms. That is, in a first case where the wireless video transmitter has received the <User Control Pressed> signal, in a second case where a continuation code is received after the end of the reception, or in a third case where a period of 500 ms is likely to elapse since the reception of the <User control Pressed> command, it follows that a control command will be again received from the device that sent out the command. It is possible to reduce the time lag in the mutual communications between the wireless video transmitter and the wireless video receiver by assigning the wireless video receiver sending out the command to periods in which transmission and arrival of commands are highly likely to occur.

A routine (processing) associated with the second embodiment for assignment made during reception of commands as illustrated in FIG. 8 is described by referring to the flowchart of FIG. 9.

When the transceiver portion 16 receives a command (S600), the CPU 14 of the wireless video transmitter makes a decision as to whether the command does not cancel the preferential assignment (S900). The command canceling the preferential assignment is a command offering the possibility that there are no ensuing commands and typified, for example, by the <User Control Released> command. If the decision at S900 is that the received command is a command canceling the preferential assignment, control goes to S905, where the measurement of time from the reception is stopped or reset, thus canceling the processing for assignment. If the decision at S900 is that the received command does not cancel the preferential assignment, control proceeds to S602, where a decision is made as to whether it is necessary to perform a timeout operation on the received command.

The timeout operation starts with measuring the time elapsed since the reception of a command if there is the possibility that the same command (typified by the <User Control Pressed> command in the present embodiment) will be reissued from the same device during some prescribed period from the reception of the command. If the measured time is coincident with an arbitrary given time, an address corresponding to the wireless video receiver that has sent out the command is saved.

If the decision at S602 is that the timeout operation is not needed, the operation is not carried out (S904). On the other hand, if the decision is that the timeout operation is necessary, the time elapsed since the reception of the command is measured (S603). A decision is made as to whether the time measured at S603 is within the prescribed period (S901). If the decision is negative (No), the operation is not performed (S904). If the measured time is coincident with the arbitrary given time (S902), an address corresponding to the wireless video receiver that has sent out the command is saved, for example, in a given storage region (storage region 1 in this example) of a RAM incorporated in the CPU 14 in S903. Then, control returns to the routine of S901.

In FIG. 9, a case in which a command from a single wireless video receiver is received is illustrated. Where plural devices have sent out commands within a prescribed period, the preferential assignment is preferably made for at least two devices. Preferential assignment for the third and following devices is canceled from the temporally oldest one. Preferably, the prescribed period is less than 600 ms. With respect to the arbitrary given period, preferentially assigned plural times are stored, for example, in a lookup table (LUT) for each kind of received command. For example, in FIG. 8, when the measured time is between 0 ms and 350 ms, transmissible periods are assigned preferentially and periodically, once in every four times. When the measured time is between 350 ms and 600 ms, the rate at which transmissible periods are assigned is made higher than in the range of 0 ms to 350 ms. That is, with respect to the arbitrary given time, periodic values of $$16.7 \text{ ms} \times (4 \times 1) = 66.8 \text{ ms}$$

$$16.7 \text{ ms} \times (4 \times 2) = 133.6 \text{ ms}$$

$$16.7 \text{ ms} \times (4 \times 3) = 200.4 \text{ ms}$$

and discrete values of 420 ms, 440 ms, 460 ms, and 480 ms are stored. Thus, the time lag in mutual communications between wireless video transmitter and wireless video receivers can be reduced during periods in which transmission and arrival of commands are highly likely to occur.

Figure 10:
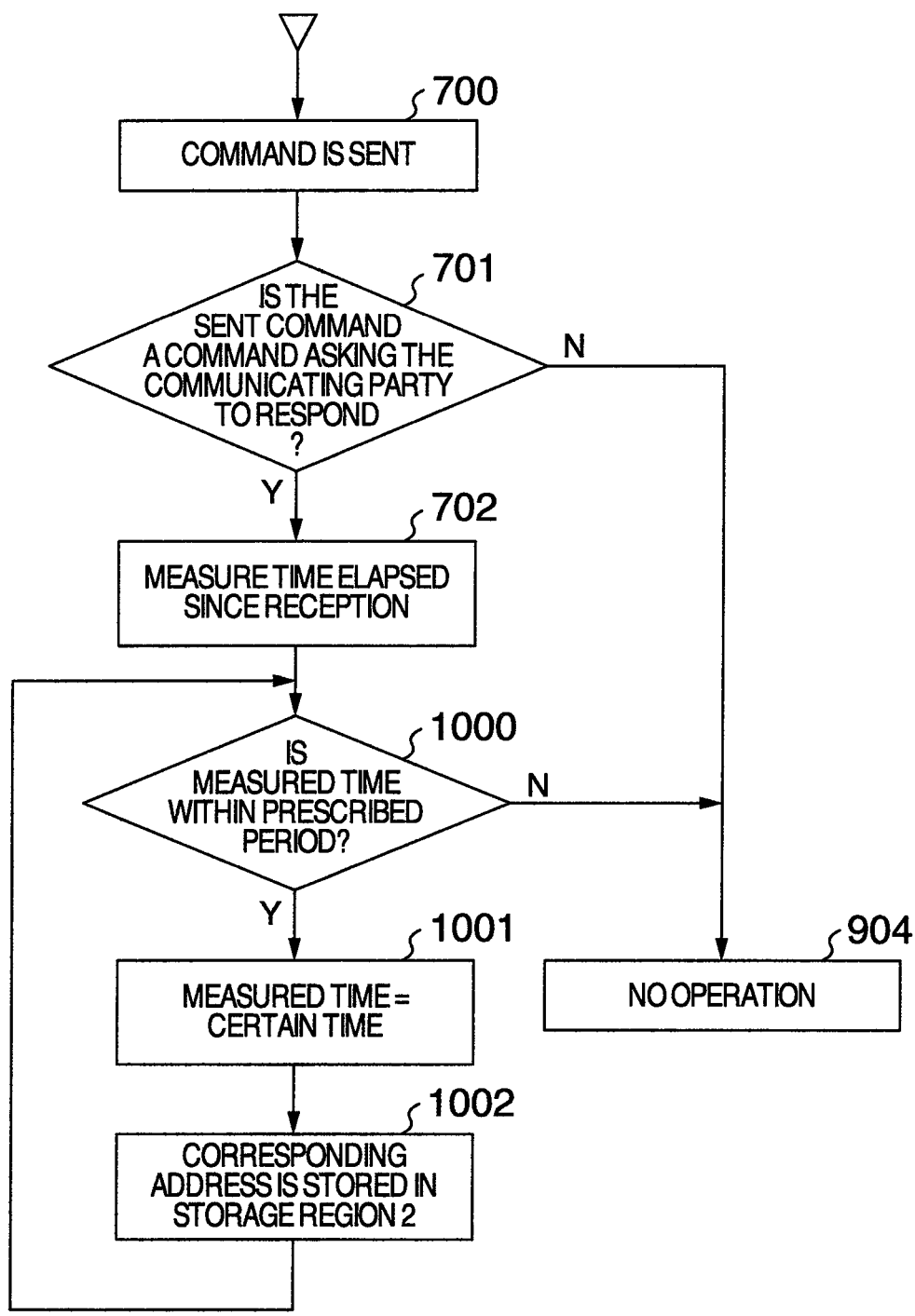
FIG. 10 is a flowchart illustrating a routine (processing) for assignment performed when commands are sent in accordance with the second embodiment.

A routine (processing) for assignment associated with the second embodiment and made during transmission of commands is next described by referring to the flowchart of FIG. 10.

If the transceiver portion 16 sends out a command (S700), the CPU 14 of the wireless video transmitter makes a decision as to whether the content of the command asks the command destination device (wireless video receiver) to respond (S701). The command asking the communicating party indicates a command offering the possibility that a command will be transmitted from the communicating party after the transmission of the command, the command being typified by a command making an inquiry to the wireless video receiver. If the decision at S701 is that the sent command does not offer the possibility that the communicating party will respond to the command, the operation is not performed (S904). On the other hand, if the decision is that there is a possibility of reply, the time elapsed since the transmission of the command is measured (S702). A decision is made as to whether the time measured at S702 is within the prescribed period (S1000). If the decision is negative, the operation is not performed (S904). If the measured time is coincident with the arbitrary given time (S1001), control goes to S1002, where an address corresponding to the command destination (wireless video receiver) is saved, for example, in a storage region 2 of the RAM incorporated in the CPU 14. Then, control returns to the processing of S1002.

The prescribed period during transmission may be identical with or different from the prescribed period (600 ms) during reception. Preferably, the period is less than 1 s. The arbitrary given time during transmission may be stored in an LUT or the like for each command sent. The arbitrary given time may be identical with or different from the arbitrary given time during transmission. Preferably, the time is less than 1 s.

Figure 11:
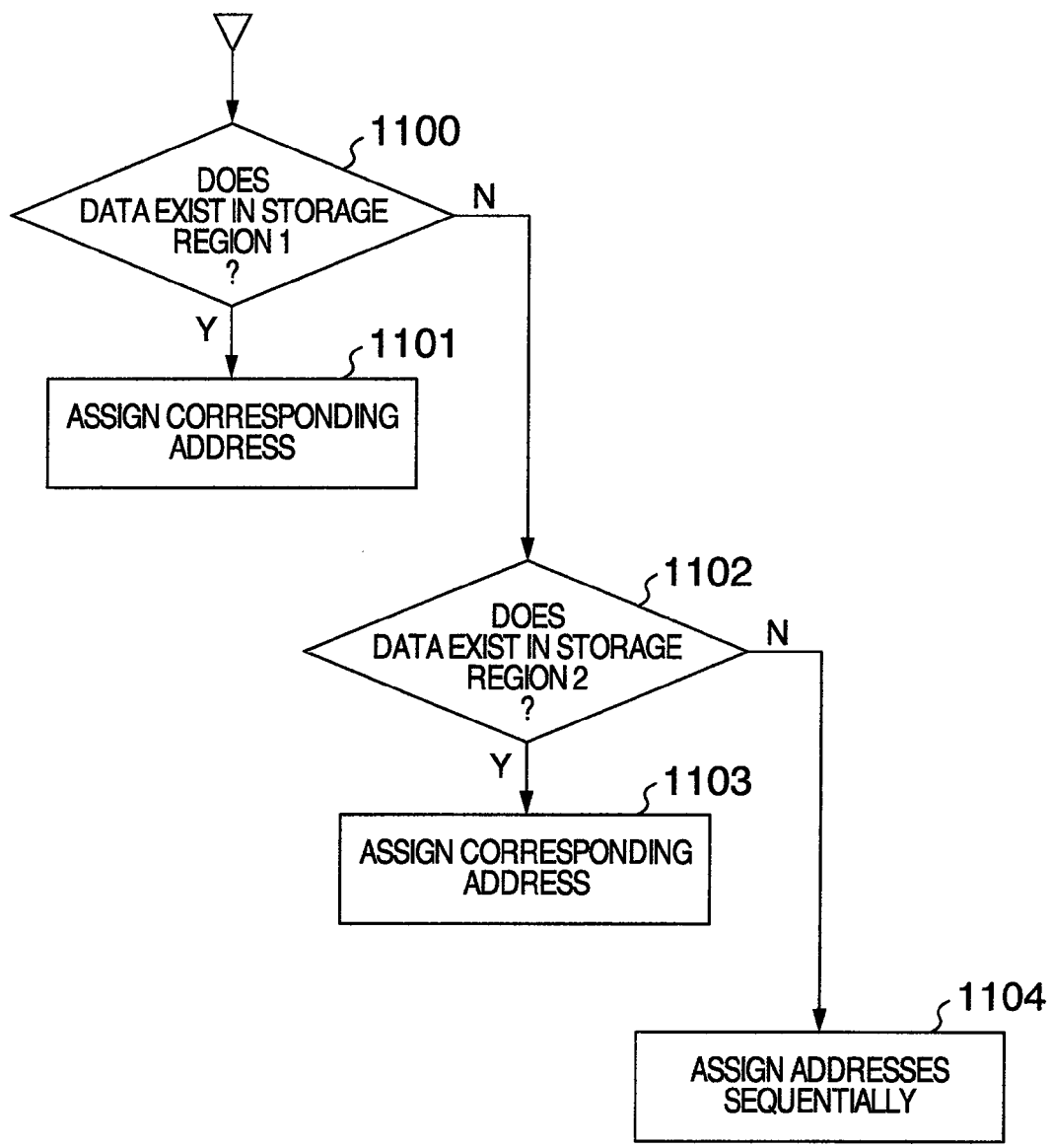
FIG. 11 is a flowchart illustrating a routine (processing) for assignment of a transmissible period made in accordance with the second embodiment.

A method of determining the priorities of the assignment routine during transmission and assignment routine during reception using the corresponding addresses obtained in the operations of FIGS. 9 and 10 is described next by referring to FIG. 11.

Where a certain wireless video receiver is assigned to the transmissible period, the CPU 14 of the wireless video transmitter makes a decision as to whether data about an address corresponding to the wireless video receiver (command sender) that has sent out the certain control command obtained by the routine of FIG. 9 exists in the storage region 1 in the RAM of the CPU 14 (S1100). If the decision at S1100 is that pertinent data exists, control goes to step S1101, where data about the address of the command sender (video receiver) is read from the storage region 1. Transmissible periods are preferentially assigned to the command sender video receiver (for example, the receiver #1) corresponding to the address, for example, by the method of the first embodiment already described in connection with FIG. 2(*c*). Then, data in the storage region 1 is discarded. If the decision at S1100 is that pertinent data is not present in the storage region 1, control goes to step 1102, where a decision is made as to whether data about the address corresponding to the command destination wireless video receiver that has sent out the certain control command obtained by the routine of FIG. 10 exists in the storage region 2 of the RAM of the CPU 14. If the decision at S1102 is that the pertinent data exists, control proceeds to S1103, where the data is read from the storage region 2. Transmissible periods are preferentially assigned to the command destination video receiver (for example, receiver #2) corresponding to the address, for example, by the method of the first embodiment already described in connection with FIG. 2(*c*). Then, the data in the storage region 2 is discarded. If the decision at S1102 is that the pertinent data does not exist in the region 2, the preferential assignment as shown in FIG. 2(*b*) is carried out at S1104.

In this way, according to the present embodiment, transmissible periods can be preferentially assigned in a corresponding manner to both cases where control commands are received and sent, respectively. Furthermore, in the present embodiment, a priority is given to the assignment made during command reception based on a user's manipulation. This can improve the response to user's manipulations. According to the need, a priority may be given to the assignment processing performed during command transmission. In this case, the operations of S1100 and S1101 of FIG. 11 and the operations of S1102 and S1103 may be reversed in order.

<<Embodiment 3>>

Figure 12:
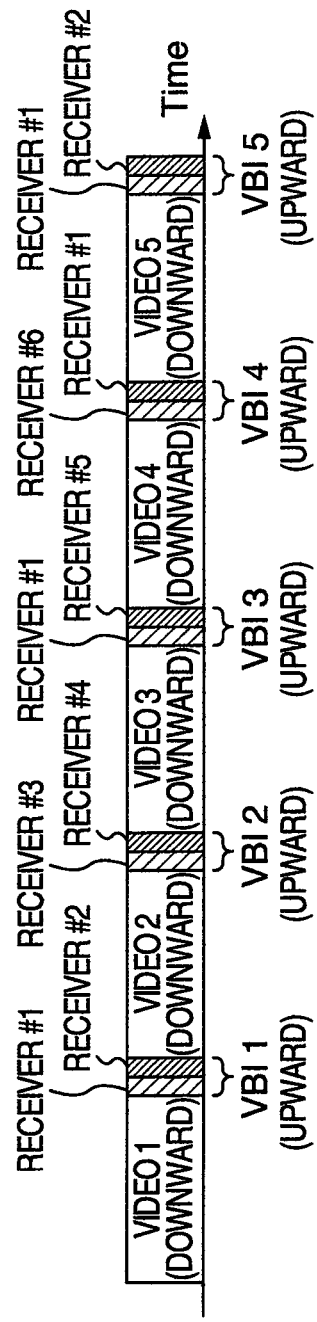
FIG. 12 is a schematic diagram illustrating assignment to wireless video receivers in accordance with a third embodiment of the invention.

A third embodiment (Embodiment 3) associated with the present invention is next described by referring to FIG. 12. The third embodiment of the invention is different from the first and second embodiments in that plural wireless video receivers are assigned to transmissible periods within one frame.

FIG. 12 schematically illustrates assignment made when the third embodiment is applied. In the example of FIG. 12, downward and upward transmissible regions are assigned to video signal periods and vertical retrace periods, respectively. Upward control commands are transferred during the vertical retrace periods. Downward control commands are transferred during the video signal periods. Assignment of downward control commands is made by multiplexing data that specify a corresponding wireless video receiver within a video signal sent by the wireless video transmitter.

Where the wireless transmitter sends contents such as movies, if five wireless video receivers are present within the wireless network as shown in FIG. 1, a state in which a single wireless video receiver can send out control commands appears every 41.7 ms×5=208.5 ms provided that the vertical scanning frequency of the video signal is 24 Hz (i.e., the vertical scanning period is 41.7 ms). That is, if N wireless video receivers exist within the wireless network, a control command is sent out every 41.7×N ms. A long time is necessary regarding control information having high real-timeness which establishes settings by mutual communications.

Accordingly, in the present embodiment, transmissible periods determined by vertical retrace periods are assigned to at least two wireless video receivers as shown in FIG. 12. This can reduce the time lag in mutual communications between the wireless video transmitter and the wireless video receiver.

In the example of FIG. 12, if a certain control command such as <User Control Pressed> defined, for example, in CEC is sent out from the receiver #1, the vertical retrace periods VBI_1 to VBI_5 are bisected by the wireless video transmitter and the former halves of the periods are preferentially assigned to the receiver #1. Consequently, as shown in FIG. 12, VBI_3 and VBI_5 other than VBI_1 are assigned as the transmissible period for the receiver #1. Hence, the transmissible period for the receiver #1 can be extended. On the other hand, the latter halves of the bisected vertical retrace periods are sequentially assigned such that all the receivers can transmit control commands within the control command transmission period.

This configuration makes it possible to assign two wireless video receivers within one transmissible period and so mutual communications owing to control commands between the wireless video transmitter and wireless video receiver can be operated stably. Furthermore, the responsiveness of the system can be improved.

Whether the assignment as shown in FIG. 2(c) or the assignment as shown in FIG. 12 is adopted may be determined depending on the frame frequency of the video signal. In particular, the CPU 14 discerns the frame frequency of the wirelessly transmitted video signal. If the frequency is higher than 30 Hz, for example, a transmissible period for one wireless video receiver is assigned to one vertical retrace period as shown in FIG. 2(c). On the other hand, if the frame frequency of the video signal is lower than 30 Hz, transmissible periods for two wireless video receivers are assigned to one vertical retrace period as in the present embodiment illustrated in FIG. 12. In this method, if the interval between the transmissible periods is prolonged because the frame frequency is low, the response can be enhanced by shortening the interval between the transmissible periods.

The present invention is employed in a system for transmitting video and audio signals wirelessly from a video transmitter to plural video receivers. Especially, the invention is adapted to cases where the response of the system to control commands is improved, for example, based on user's manipulations and the stability of mutual communications is enhanced.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A video transmitter for wirelessly sending a video signal to a plurality of video receivers, the video transmitter comprising:

a receiver portion configured to receive a command from any one of the plurality of video receivers; and a control portion configured to determine whether or not the command received by the receiver portion of the video transmitter is a given command, wherein:

a vertical retrace period of each frame of the video signal wirelessly sent by the video transmitter is assigned as a transmissible period for sending a command from each of the plurality of video receivers to the video transmitter;

when the control portion of the video transmitter determines the received command is the given command, during a command transmission period in which all of the plurality of video receivers can transmit commands, in response to the received given command, the control portion of the video transmitter assigns the transmissible periods for each of the video receivers per the vertical retrace period such that more transmissible periods are assigned to the video receiver that has sent out the received given command than to other video receivers;

each frame of the video signals includes a header;

the header of each frame of the video signals includes an identification (ID) number of one of the plurality of video receivers;

the vertical retrace period of each frame of the video signals is assigned as the transmissible period of the video receiver which corresponds to the ID number included in the header of each frame of the video signals; and when the control portion of the video transmitter determines that the received command is a given command, the control portion of the video transmitter, during the command transmission period, changes the ID number of the header such that the number of headers having the ID number corresponding to the video receiver transmitting the given command is more than the number of headers having an ID number corresponding to the other video receiver.

2. The video transmitter as set forth in claim 1, wherein the command transmission period is a period of frame numbers equal to the number of the video receivers.

3. The video transmitter as set forth in claim 2, wherein when a command associated with transmission of a remote control signal is received, the control portion of the video transmitter assigns the transmissible periods preferentially to the video receiver that has sent out the command associated with the transmission of the remote control signal during a given period of time or until a remote control canceling command is received.

4. The video transmitter as set forth in claim 3, wherein the preferentially assigned transmissible periods are fewer in number than the number of the plurality of the video receivers.

5. The video transmitter as set forth in claim 1, wherein:

the transmissible periods are assigned preferentially and periodically at a first rate when a measured time since the reception of the command is between 0 ms and 350 ms;

the transmissible periods are assigned preferentially and periodically at a second rate when the measured time since the reception of the command is greater than 350 ms and less than or equal to 600 ms, and the measured time is within a given interval of time during the reception of the command, and the second rate is higher than the first rate.

6. A video transmitter for sending a video signal to at least one or more video receivers, the video transmitter comprising:
- a transceiver portion configured to receive a command from the at least one or more video receivers and to send a command to the at least one or more video receivers; and
- a control portion configured to assign a transmissible period to be used for transmitting the command, wherein:
- when the command received from the at least one or more video receivers or the command transmitted to the transceiver portion is a given command during a command transmission period in which all of the video receivers can transmit commands, in response to the given command, the control portion of the video transmitter assigns a transmissible period of a video receiver per a vertical retrace period of a frame of the video signal in such a way that more transmissible periods are assigned to the video receiver that has sent out the given command than to any other video receivers;
- the frame of the video signal includes a header;
- the header of the frame of the video signal includes an identification (ID) number of one of the plurality of video receivers;
- the vertical retrace period of the frame of the video signal is assigned as the transmissible period of the video receiver which corresponds to the ID number included in the header of the video signal; and
- when the control portion of the video transmitter determines that the received command is a given command, the control portion of the video transmitter, during the command transmission period, changes the ID number of the header such that the number of headers having the ID number corresponding to the video receiver transmitting the given command is more than the number of headers having an ID number corresponding to the other video receiver.

7. The video transmitter as set forth in claim 6, wherein the command transmission period is a period of frame numbers equal to the number of the at least one or more video receivers.

8. The video transmitter as set forth in claim 7, wherein when a command asking for a reply is sent from the video transmitter, the command transmission periods are preferentially assigned to the video receiver receiving the command asking for a reply during a given interval of time or until the reply is received.

9. The video transmitter as set forth in claim 2, wherein the control portion of the video transmitter assigns one video receiver during one vertical retrace period when the frame frequency of the video signal is in excess of 30 Hz and assigns at least two video receivers during one vertical retrace period when the frame frequency is equal to or lower than 30 Hz.

10. The video transmitter as set forth in claim 2, wherein during the command transmission period in which all of the video receivers can transmit commands, the vertical retrace periods assigned to the video receiver that has sent out the given command are increased in number to thereby extend a total period of the transmissible periods for the video receiver that has sent out the given command.

11. The video transmitter as set forth in claim 7, wherein the control portion of the video transmitter assigns one video receiver during one vertical retrace period when the frame frequency of the video signal is in excess of 30 Hz and assigns at least two video receivers during one vertical retrace period when the frame frequency is equal to or lower than 30 Hz.

* * * * *